US012320150B2

(12) United States Patent
Ergen et al.

(10) Patent No.: US 12,320,150 B2
(45) Date of Patent: Jun. 3, 2025

(54) AUTOMATIC ADJUSTING BARREL LOCK KEY

(71) Applicant: Rexnord Industries, LLC, Milwaukee, WI (US)

(72) Inventors: Eric C. Ergen, West Allis, WI (US); Bernard Krauska, Waukesha, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 414 days.

(21) Appl. No.: 17/404,696

(22) Filed: Aug. 17, 2021

(65) Prior Publication Data

US 2023/0059864 A1 Feb. 23, 2023

(51) Int. Cl.

*E05B 19/00* (2006.01)
*E05B 35/00* (2006.01)
*E05B 67/36* (2006.01)

(52) U.S. Cl.

CPC .......... *E05B 19/0017* (2013.01); *E05B 19/00* (2013.01); *E05B 19/0082* (2013.01); *E05B 35/003* (2013.01); *E05B 67/365* (2013.01)

(58) Field of Classification Search

CPC ............... Y10T 292/14; Y10T 292/202; Y10T 292/205; Y10T 292/212; E05B 19/00; E05B 67/365; E05B 19/0017; E05B 19/04; E05B 19/18; E05B 35/003; E05B 35/008; E05B 35/02; E05B 65/0089; E05B 67/36

See application file for complete search history.

(56) References Cited

U.S. PATENT DOCUMENTS 3,033,016 A 5/1962 Moberg
4,040,279 A * 8/1977 Signorelli ............. E05B 67/365 70/34
4,058,992 A 11/1977 Nielsen, Jr.
4,155,232 A 5/1979 Haus, Jr. et al.
4,252,006 A 2/1981 Swisher
4,254,647 A 3/1981 Finck, Jr.
4,296,616 A 10/1981 Guiler
4,426,860 A 1/1984 Swisher
4,441,343 A 4/1984 Nielsen, Jr. et al.
4,474,041 A 10/1984 Finck, Jr.
4,483,164 A 11/1984 Nielsen, Jr. et al.

(Continued)

OTHER PUBLICATIONS

Dewalch Technologies, Inc., Plunger Style Barrel Locks and Keys, https://www.dewalch.com/plunger-lock, 1 page [printed Nov. 5, 2021].

(Continued)

*Primary Examiner* — Carlos Lugo
(74) *Attorney, Agent, or Firm* — Reinhart Boerner Van Deuren s.c.

(57) ABSTRACT

A barrel lock key is configured to unlock a variety of barrel locks requiring various stroke lengths of a barrel lock key to be unlocked. The barrel lock key can be actuated between a neutral position, an intermediate position, and an overthrow position. In the neutral position, there are no outside forces acting on the barrel lock key. In an intermediate position, the barrel lock key can be configured to place a barrel lock in an unlocked orientation. In the overthrow position, the barrel lock key is fully actuated and is configured to maintain a barrel lock in an unlocked orientation without excessive forces that act to disengage the barrel lock key from the barrel lock.

24 Claims, 7 Drawing Sheets

(56) References Cited

U.S. PATENT DOCUMENTS

| | | | | |
|---|---|---|---|---|
| 4,492,100 | A | | 1/1985 | Swisher |
| 4,513,591 | A | | 4/1985 | Carlson et al. |
| 4,513,592 | A | | 4/1985 | Agbay |
| 4,586,425 | A | * | 5/1986 | Redman ................ F15B 15/261 92/24 |
| 4,635,452 | A | | 1/1987 | Agbay |
| 4,698,988 | A | | 10/1987 | Swisher |
| 4,712,395 | A | | 12/1987 | Agbay |
| 4,840,049 | A | | 6/1989 | Russo |
| 5,027,624 | A | | 7/1991 | Agbay et al. |
| 5,301,524 | A | | 4/1994 | Georgopoulos et al. |
| 5,440,909 | A | | 8/1995 | Ely et al. |
| 6,490,892 | B1 | | 12/2002 | Freiman |
| 7,448,235 | B2 | | 11/2008 | Ely et al. |
| 8,863,563 | B2 | | 10/2014 | Gentile et al. |
| 9,528,297 | B2 | | 12/2016 | Gentile |
| 2012/0210757 | A1 | | 8/2012 | Gentile |

OTHER PUBLICATIONS

Highfield Manufacturing Company, Product Catalog, 41 pages [printed Oct. 20, 2021].

Highfield Manufacturing Company, Barrel Locks & Keys, https://www.highfield-mfg.com/products/barrel-lock-key-system, Copyright 2021, 2 pages.

Inner-Tite Corp., Plunger Style Barrel Locks and Keys—Electric, https://www.inner-tite.com/products/electric-utility-products/barrel-locks-and-keys-electric/plunger-style-barrel-locks-and-key-electric, 2 pages [printed Nov. 5, 2021].

* cited by examiner

AUTOMATIC ADJUSTING BARREL LOCK KEY

CROSS-REFERENCE TO RELATED APPLICATION

Not applicable.

STATEMENT CONCERNING FEDERALLY SPONSORED RESEARCH AND DEVELOPMENT

Not applicable.

TECHNICAL FIELD

The present disclosure is described in the context of a barrel lock key. More specifically, the present disclosure relates to an automatic adjusting barrel lock key configured to unlock barrel locks having a variety of stroke lengths with a consistent and complete activation of the barrel lock key.

BACKGROUND

Barrel locks typically include a circular keyway configured to receive a plunger of a barrel lock key used to unlock the barrel lock. In general, the barrel lock is unable to be unlocked without retracting a set of ball bearings within the barrel lock. A barrel lock key can be configured, for instance, as a plunger-type key with a plunger that can be inserted into the keyway of the barrel lock. By placing the plunger into the keyway, the key can grasp an internal lock plunger of the barrel lock to release the catch that inhibits the inward movement of the ball bearings or other lock member(s). A lever of the barrel lock key can be used to actuate the plunger to release the set of ball bearings once the lever has completed a required stroke.

Barrel locks of differing designs and/or constructions often require distinct stroke lengths to operatively unlock. With some barrel lock keys, if the interface between the barrel lock and the key is activated beyond the necessary movement to unlock the barrel lock, the key can slip or be pulled out of engagement with the lock. As a result, a key operator must consciously resist excessively moving the lever of the key or else the key will disengage with and not unlock the barrel lock.

Therefore, in view of at least the above, a need exists for an improved barrel lock key that employs a consistent unlocking action that can unlock a variety of barrel locks having different stroke length requirements.

SUMMARY

Some embodiments described herein provide a barrel lock key configured to operate a variety of barrel locks. The variety of barrel locks can require different stroke lengths of a barrel lock key to move the barrel lock from a locked position to an unlocked position. The barrel lock key can be moved between a neutral position, an intermediate position, and an overthrow position. In the neutral position, there are no outside forces acting on the barrel lock key. In an intermediate position, the barrel lock key can be configured to place a barrel lock in an unlocked orientation. In the overthrow position, the barrel lock key is fully actuated (e.g., a lever of the barrel lock key is fully stroked relative to a body of the barrel lock key) and the barrel lock key is configured to maintain a barrel lock in an unlocked orientation.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Figure 1:
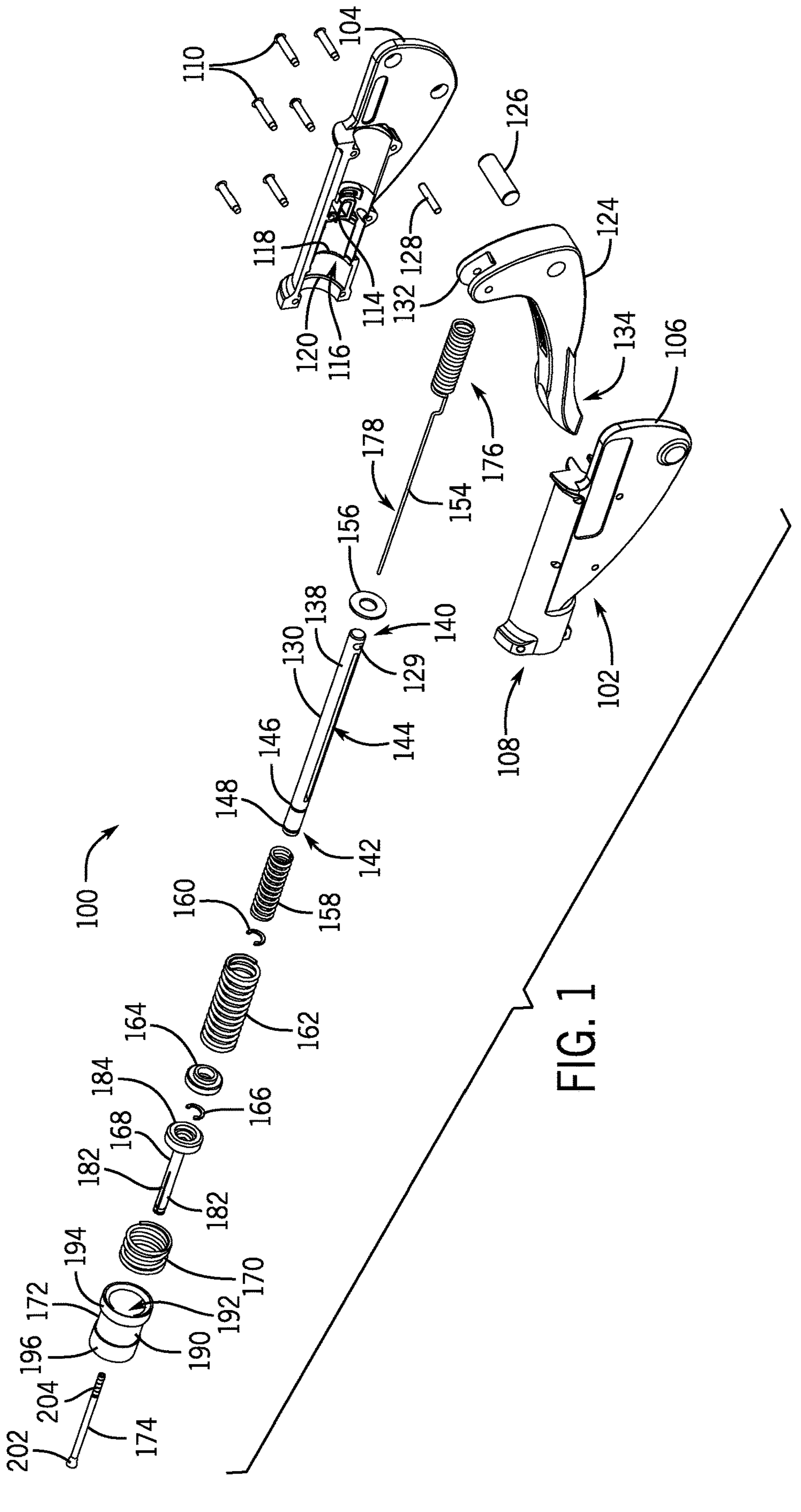
FIG. 1 is an exploded isometric view of a barrel lock key according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from the invention. Thus, embodiments of the invention are not intended to be limited to embodiments shown, but are to be accorded the widest scope consistent with the principles and features disclosed herein.

As briefly described above, different types and/or styles of barrel locks (e.g., such as the #4 Series, the #6 Series, the Beta Series, and the REVPRO Series offered by Highfield Manufacturing Co. of Cudahy, Wisconsin) may require different stroke lengths of a barrel lock key to operate/unlock. For instance, if a stroke length of a key exceeds the required movement to unlock a barrel lock, the key can become disengaged or disconnected from the lock, and the lock will remain in a locked orientation/condition. In other examples, some keys for a barrel lock require a user to only partially stroke the lever and the user must be cautious to not over stroke the lever, which can again cause the key to prematurely disengage from the lock. Other keys for a barrel lock may include detents or distinct positions to give a user feedback on when an appropriate stroke for a particular barrel lock is completed. However, in such keys, the user may have to know and understand a wide variety of barrel locks and how each distinct position corresponds to a particular barrel lock, which can be cumbersome, time consuming, and difficult to operate in practice.

Embodiments of the disclosure address these and other issues. For example, embodiments of the disclosure provide a barrel lock key configured to automatically adjust an effective stroke length for a variety of barrel locks each time the barrel lock key is fully actuated. In particular, the barrel lock key can be actuated from a neutral position to an intermediate position to unlock a barrel lock. The barrel lock key can then be fully actuated past the intermediate position regardless of when during the intermediate actuation the barrel lock was moved to an unlocked orientation. When the barrel lock key is in the fully actuated position, the barrel lock remains unlocked and coupled to the barrel lock key. A similar unlocking action can be performed on a different barrel lock that requires a different stroke length to be moved from a locked orientation to an unlocked orientation so that, similarly, the barrel lock key can be moved from a neutral position to a fully actuated position while unlocking the barrel lock at some position from the neutral position to the fully actuated position.

In general, the barrel lock key according to embodiments of the disclosure can include an inner spring, a main spring, and a nose spring. The inner spring can be configured to compress during each of an initial contact between the barrel lock key and a barrel lock, moving the barrel lock into an unlocked position via an intermediate actuation of the barrel lock key, and moving the lever into a fully actuated position. The main spring can compress when moving the barrel lock into the unlocked position via the intermediate actuation of the barrel lock key and moving the lever into the fully actuated position. Finally, the nose spring can be configured to compress when the barrel lock is in the unlocked position and the effective stroke length required to unlock the barrel lock has been completed but the lever is not yet in the fully actuated position. In general, the nose spring is compressed during an overthrow position/condition of the barrel lock key that corresponds to the continued actuation of the lever while the barrel lock is in the unlocked position.

The general components of an example barrel lock key 100 are first described below, followed by a discussion of the assembly of the components and the operation of the example barrel lock key 100 as it engages/interacts with an example barrel lock 230. FIG. 1 illustrates a barrel lock key 100 according to one example embodiment of the invention. While the barrel lock key 100 is illustrated as a pivotal, lever-type key, the form factor and construction of a key incorporating the concepts described herein may take a variety of forms (e.g., a pistol-grip style key, a linear pull-type key, etc.). The barrel lock key 100 includes a housing 102 having first and second body members 104, 106 that at least partially house components of the barrel lock key 100. Each of the first and second body members 104, 106 include a distal end portion adjacent to a distal end 108 of the barrel lock key 100. The first body member 104 can be secured to the second body member 106 via fasteners 110. In the illustrated embodiment, the fasteners 110 are configured as a plurality of pins. The pins include a threaded portion and can secure the first body member 104 to the second body member 106 via an interference fit of the pins with the housing 102. In other embodiments, the first body member 104 can be secured to the second body member 106 via one or more of pins, clips, screws, adhesives, etc., or an interference fit such as a press fit or friction fit, for example.

In the illustrated embodiment, the first body member 104 can include an interior ledge formed on the inside of the housing 102. Though not visible in FIG. 1, the second body member 106 can similarly include a corresponding interior ledge formed on the inside of the housing 102 to collectively form an interior housing ledge 114. The housing 102 also includes a nose region 116 adjacent to the distal end 108 of the barrel lock key 100. The nose region 116, collectively formed by the first body member 104 and the second body member 106, includes a first nose stop 118 and a second nose stop 120. The first nose stop 118 is configured as an interior annular ledge at a proximal portion of the nose region 116. The second nose stop 120 is configured as an interior annular ledge at a distal end of the nose region 116.

The first body member 104 and the second body member 106 are rotatably secured to a lever 124 via a body pivot pin 126. The body pivot pin 126 extends between the first and second body members 104, 106 and through the lever 124 so that the lever 124 can rotate relative to the housing 102. Parallel to the body pivot pin 126, the lever 124 also receives a rod pin 128 at a clevis portion 132 of the lever 124. The rod pin 128 links rotation of the lever 124 to translation of a main rod 130 of the barrel lock key 100. The lever 124 also includes a handle portion 134 at a distal end of the lever 124 opposite the clevis portion 132.

The main rod 130 defines a rod body 138 that extends from a proximal end 140 to a distal end 142 of the main rod 130. The rod pin 128 extends laterally from a slot 129 in the rod body 138 at the proximal end 140 of the main rod 130 to link the translation of the main rod 130 to the rotation of the lever 124. A channel 144 is formed in a lateral side of the rod body 138 and extends between the proximal end 140 and the distal end 142 of the main rod 130. At the distal end 142, the channel 144 connects to an interior passageway through the rod body 138. The interior passageway has an opening at an axial end of the main rod 130 at the distal end 142 (see, for example, FIG. 3). The main rod 130 also includes first and second annular recesses 146, 148 formed in the rod body 138 near the distal end of the main rod 130.

With continued reference to FIG. 1, the barrel lock key 100 further includes a rodded spring 154, a washer 156, an inner spring 158, a first snap ring 160, a main spring 162, a collar 164, a second snap ring 166, a finger member 168, a nose spring 170, a nose 172, and a plunger 174. The rodded spring 154 includes a coiled section 176 and rod section 178. The rod section 178 is dimensioned to extend through the channel 144 of the main rod 130 and out through the opening at the axial end of the main rod 130. The finger member 168 includes fingers 182 extending from a base 184 of the finger member 168. In the illustrated embodiment, the fingers 182 include three fingers annularly spaced apart at a distal end of the finger member 168. However, in other embodiments, fewer or more fingers may extend from the base 184 of the finger member 168. In general, the fingers 182 of the finger member 168 are flexible and configured to be selectively flared radially outward during operation of the barrel lock key 100.

The nose 172 of the barrel lock key 100 defines a nose body 190 and a bore 192 extending through the nose body 190. The nose body 190 includes a first annular projection 194 at a proximal end of the nose 172 and a second annular projection 196 at a distal end of the nose 172. The plunger 174, which at least partially extends through the bore 192 of the nose 172, defines a hollow body and includes a conical end 202. The conical end 202 is configured as a flared portion of the plunger 174 at a distal end of the plunger 174. Opposite the conical end 202, the plunger 174 includes a threaded end 204. The threaded end 204 includes external threads that are configured to engage corresponding threads of the main rod 130. The corresponding threads of the main rod 130 are configured as internal threads at the distal end 142 of the main rod 130.

Figure 2:
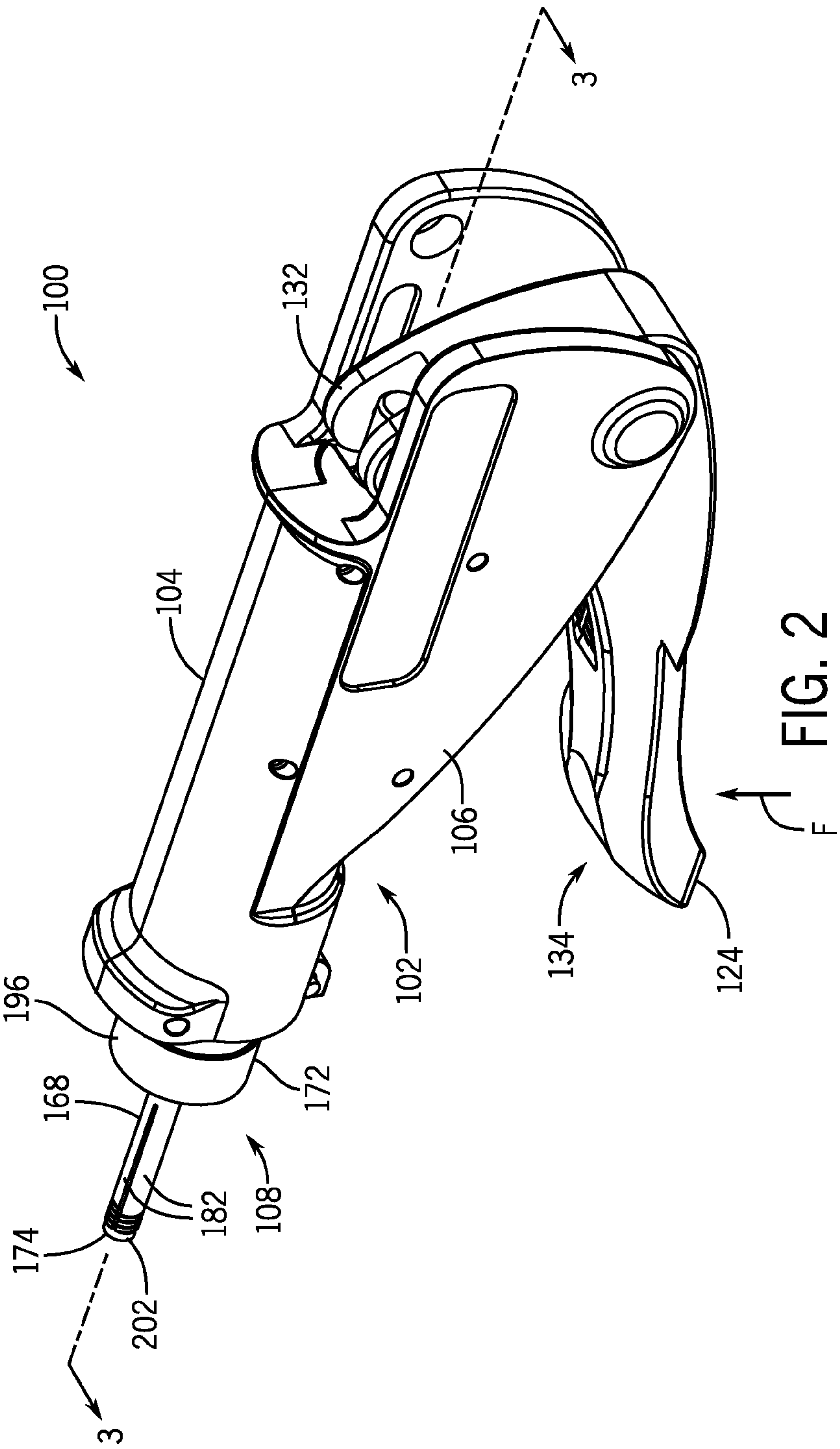
FIG. 2 is an isometric view of the barrel lock key of FIG. 1.

FIG. 2 illustrates the barrel lock key 100 in a neutral (e.g., at rest) position/state. As described above, the lever 124 is rotationally secured to the first and second body members 104, 106 so that the handle portion 134 of the lever 124 extends below (relative to FIG. 2) the housing 102. The nose 172 extends outside the first and second body members 104, 106 at the distal end 108 of the barrel lock key 100 so that the first annular projection 194 of the nose 172 is housed within the nose region 116 and the second annular projection 196 is disposed outside the housing 102. The second annular projection 196 is axially spaced from the first and second body members 104, 106 proximate to the distal end 108 of the barrel lock key 100 when the barrel lock key 100 is in the neutral condition.

The fingers 182 of the finger member 168 extend through the bore 192 of the nose 172 and outside of the housing 102. The plunger 174 extends within the finger member 168 and axially through the fingers 182 so that the conical end 202 of the plunger 174 is adjacent to a distal end of the fingers 182. In use, when the plunger 174 is moved in a proximal direction relative to the fingers 182, the conical end 202 flexes the fingers 182 radially outward, as will be described in greater detail below. Additionally, in use, an actuating force F can be applied to the lever 124 at the handle portion 134 in the direction indicated in FIG. 2 to rotate the lever 124 relative to the housing 102. When the lever 124 is actuated, the coupling between the lever 124 and the main rod 130 causes the main rod 130 to retract proximally into the housing 102. In general, the lever 124 is configured to move between a resting position as shown in FIG. 2 to a fully-compressed or actuated position as shown, for example, in FIG. 7. The distance the lever 124 travels from the resting position to the fully-compressed position defines a full stroke length of the lever 124.

Figure 3:
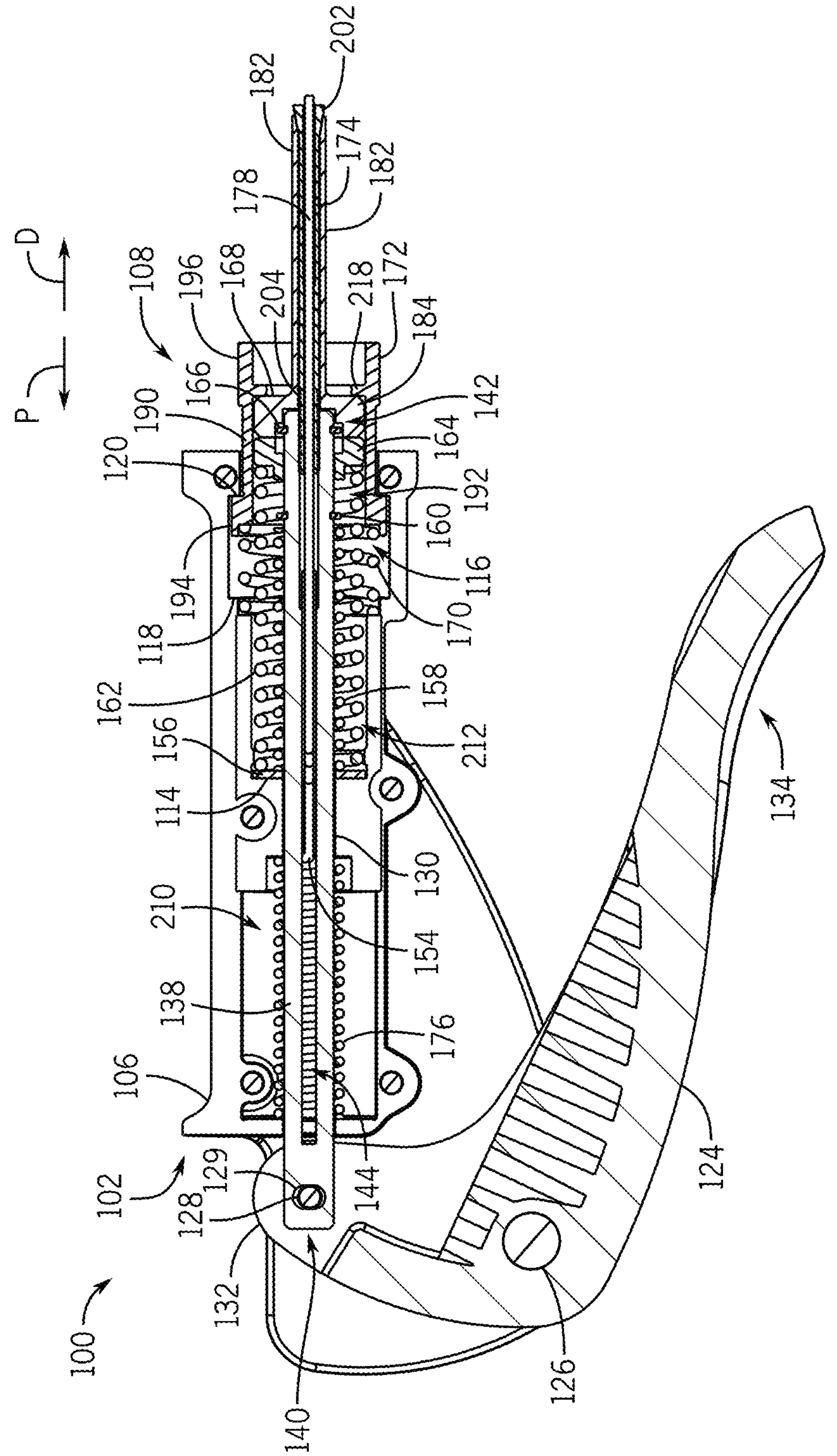
FIG. 3 is a cross-sectional side view of the barrel lock key of FIG. 1 taken along line 3-3 of FIG. 2.

FIG. 3 also illustrates the barrel lock key 100 in the neutral position. As shown in FIG. 3, the housing 102 further includes a proximal end cavity 210 and a central cavity 212. The proximal end cavity 210 is axially opposite from the distal end 108 of the barrel lock key 100. The central cavity 212 is disposed between the proximal end cavity 210 and the nose region 116 of the housing 102. The main rod 130 is pivotably/slideably connected to the lever 124 at the proximal end 140 of the main rod 130 and extends through/within each of the proximal end cavity 210, the central cavity 212, and the nose region 116. The coiled section 176 of the rodded spring 154 is seated within the proximal end cavity 210 and concentrically surrounds the main rod 130. The rod section 178 of the rodded spring 154 enters the channel 144 of the main rod 130 adjacent to the proximal end cavity 210 and extends through the passageway at the distal end 142 of the main rod 130.

The rod section 178 of the rodded spring 154 further extends through each of the finger member 168 and the plunger 174. The rod section 178 of the rodded spring 154 exits the plunger 174 adjacent to the conical end 202 of the plunger 174. As briefly discussed above, the threaded end 204 of the plunger 174 is threadedly engaged to the distal end 142 of the main rod 130 and the plunger 174 extends through the finger member 168, including the fingers 182 of the finger member 168. In use, the rod section 178 of the rodded spring 154 generally remains static relative to the housing 102 while the lever 124 is actuated, which causes the main rod 130 and the plunger 174 to move in the proximal direction P relative to the housing 102. When the plunger 174 moves in the proximal direction P relative to the finger member 168, the conical end 202 moves distally within the finger member 168 to urge the fingers 182 radially outward, which further establishes a frictional engagement between the fingers 182 and the barrel lock 230 (as further discussed below).

With continued reference to FIG. 3, the washer 156 is configured to abut the housing 102 at the interior ledge 114 in the central cavity 212. Each of the inner spring 158 and the main spring 162 are configured to engage the washer 156 at respective proximal ends of the inner spring 158 and the main spring 162. The inner spring 158 and the main spring 162 are concentrically aligned so that the main spring 162 surrounds the inner spring 158. Additionally, the inner spring 158 and the main spring 162 are axially aligned with the main rod 130 so that the main rod 130 extends through both the inner spring 158 and the main spring 162. The inner spring 158 extends within the central cavity 212 of the housing 102 between the washer 156 and the first snap ring 160. The main spring 162 extends within the central cavity 212 and the nose region 116 of the housing 102 between the washer 156 and the collar 164.

In general, the inner spring 158 biases the main rod 130 in the distal direction D relative to the washer 156 via the first snap ring 160 seated within the first annular recess 146 of the main rod 130. Likewise, the main spring 162 biases the collar 164 in the distal direction D relative to the washer 156. In the rest position shown in FIG. 3, the distal end 142 of the main rod 130 engages the finger member 168 at the base 184 to urge the finger member 168 toward the distal direction D via the inner spring 158. Additionally, the collar 164 engages the finger member 168 at the base 184 to urge the finger member 168 toward the distal direction D via the main spring 162. In the rest position, and any position in between when the lever 124 is in the resting position and the fully-compressed position, the collar 164 is in contact with the base 184 of the finger member 168 within the bore 192 of the nose 172.

The nose 172 further includes an internal flange 218 within the bore 192 of the nose body 190. In the rest position as shown in FIG. 3, a side of the base 184 of the finger member 168 opposite the collar 164 abuts the internal flange 218 to urge the nose 172 toward the distal direction D relative to the housing 102. Additionally, the nose 172 is biased toward the distal direction D via the nose spring 170. The nose spring 170 extends within the nose region 116 of the housing 102 between near the first nose stop 118 of the housing 102 and the nose 172 adjacent to the first annular projection 194 of the nose body 190. The distal end of the nose spring 170 is seated radially inward of the first nose stop 118 (as shown, for example, in FIG. 3). As briefly described above, the first annular projection 194 of the nose 172 is housed within the nose region 116, and in the rest position, the first annular projection 194 is seated against the second nose stop 120 of the housing 102.

When given the benefit of this disclosure, one of skill in the art will appreciate that the form factor and construction of the example barrel lock key may comprise various alternatives. For instance, components may be integrally formed in various combinations and other components divided in alternative ways. In addition, while the springs (e.g., the inner spring 158, the main spring 162, and the nose spring 170) are illustrated as coil springs, other types and form factors of resilient members may be adapted for use in connection with the disclosed concepts. As one non-limiting example, one or more of the coil springs may be replaced by a resilient/compressible material (e.g., a rubber, a polymer, etc.) that functions to provide the desired urging forces described herein.

FIGS. 4-7 illustrate the example barrel lock key 100 interacting with (e.g., unlocking) an exemplary barrel lock 230 according to one embodiment of the invention. The barrel lock 230 includes a housing 232 having a first end 234 (e.g., a head end) configured to engage the nose 172 of the barrel lock key 100. The barrel lock 230 further includes a lock plunger 236, a secondary plunger 238, a lock spring 240, and a secondary spring 242. The lock spring 240 urges the lock plunger 236 in the distal direction D, and the secondary spring 242 urges the secondary plunger 238 in the proximal direction P. Detent balls 244 are urged into corresponding recesses via the lock plunger 236 and are allowed to move radially inward toward the secondary plunger 238 when the lock plunger 236 is moved in the proximal direction P to an unlocked orientation.

Figure 4:
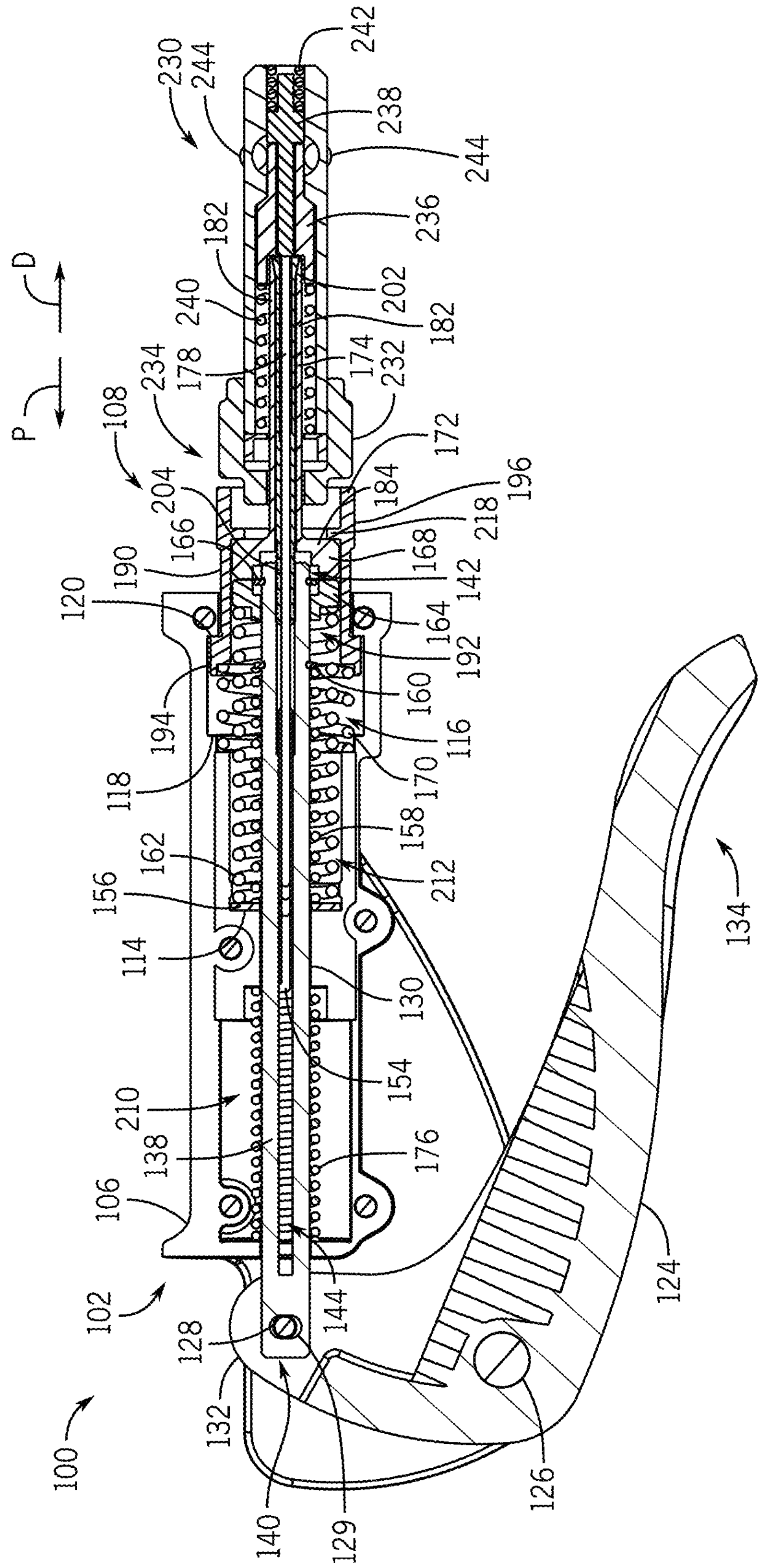
FIG. 4 is a cross-sectional side view of the barrel lock key of FIG. 1 making contact with an example barrel lock.

With reference to FIG. 4, in use, a barrel lock, such as the barrel lock 230, for example, can be brought into contact with the barrel lock key 100 at the distal end 108 of the barrel lock key 100. A distal end of the rod section 178 of the rodded spring 154 can be inserted into the barrel lock 230 to engage the secondary plunger 238. The first end 234 of the housing 232 of the barrel lock 230 can be inserted into the distal end of the bore 192 of the nose 172 and moved toward the internal flange 218. The conical end 202 of the plunger 174 and the fingers 182 of the finger member 168 can extend into the lock plunger 236 of the barrel lock 230. Initial axial engagement between the lock plunger 236 and the conical end 202 of the plunger 174 can begin to urge the fingers 182 radially outward to frictionally engage/couple the barrel lock key 100 to the barrel lock 230.

In the orientation illustrated in FIG. 4, there are no outside (e.g., actuation) forces applied to the lever 124. However, the initial engagement of the barrel lock 230 with the conical end 202 of the plunger 174, which is rigidly coupled to the main rod 130, can move the main rod 130 in the proximal direction P slightly (e.g., less than 10% of the total distance the main rod 130 is able to move in the proximal direction P with respect to the housing 102). With the initial movement of the main rod 130 in the proximal direction P, the inner spring 158 is slightly compressed (e.g., compressed less than 10% of when the barrel lock key 100 was in the neutral position).

Figure 5:
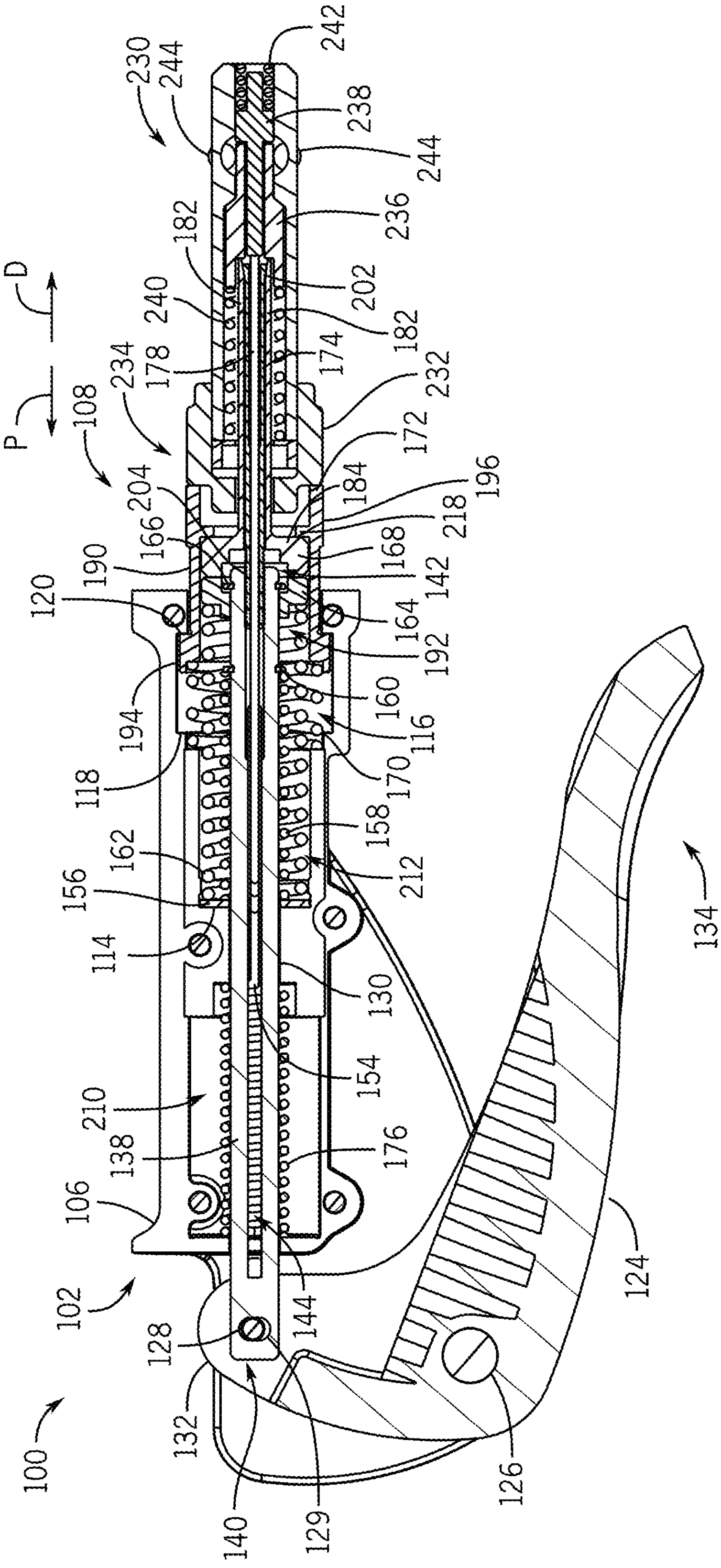
FIG. 5 is a cross-sectional side view of the barrel lock key of FIG. 1 with a nose of the barrel lock key engaging the barrel lock.

FIG. 5 illustrates the example engagement and alignment of the first end 234 (e.g., the head end) of the barrel lock 230 with the distal end 108 of the barrel lock key 100. When the barrel lock 230 is aligned with the barrel lock key 100, the second annular projection 196 of the nose 172 engages a shoulder portion of the housing 232 of the barrel lock 230 at the first end 234 of the barrel lock 230. Additionally, when the barrel lock 230 is aligned with the barrel lock key 100, as illustrated in FIG. 5, the conical end 202 of the plunger 174 is urged further in the proximal direction P with respect to the finger member 168 so that the conical end 202 is moved in between the fingers 182 to flare the fingers 182 radially outward. As the fingers 182 are flared radially, they engage and grasp the lock plunger 236 of the barrel lock 230 to linearly couple (e.g., via a frictional/interference fit) the lock plunger 236 and the finger member 168.

Similar to the orientation illustrated in FIG. 4, in the orientation illustrated in FIG. 5, there are no outside forces applied to the lever 124. However, the engagement of the barrel lock 230 at the distal end 108 of the barrel lock key 100 can move or urge the main rod 130 slightly in the proximal direction P with respect to the housing 102. With the slight movement of the main rod 130, the inner spring 158 is slightly compressed. Additionally, in some embodiments, the rodded spring 154 can continue to remain static relative to the barrel lock key 100 and the barrel lock 230. However, in other embodiments, the coiled section 176 of the rodded spring 154 can be compressed when the rod section 178 engages the secondary plunger 238 of the barrel lock 230, which, for example, can be a result of a tolerance stack up or interference from debris build up within the barrel lock 230.

Figure 6:
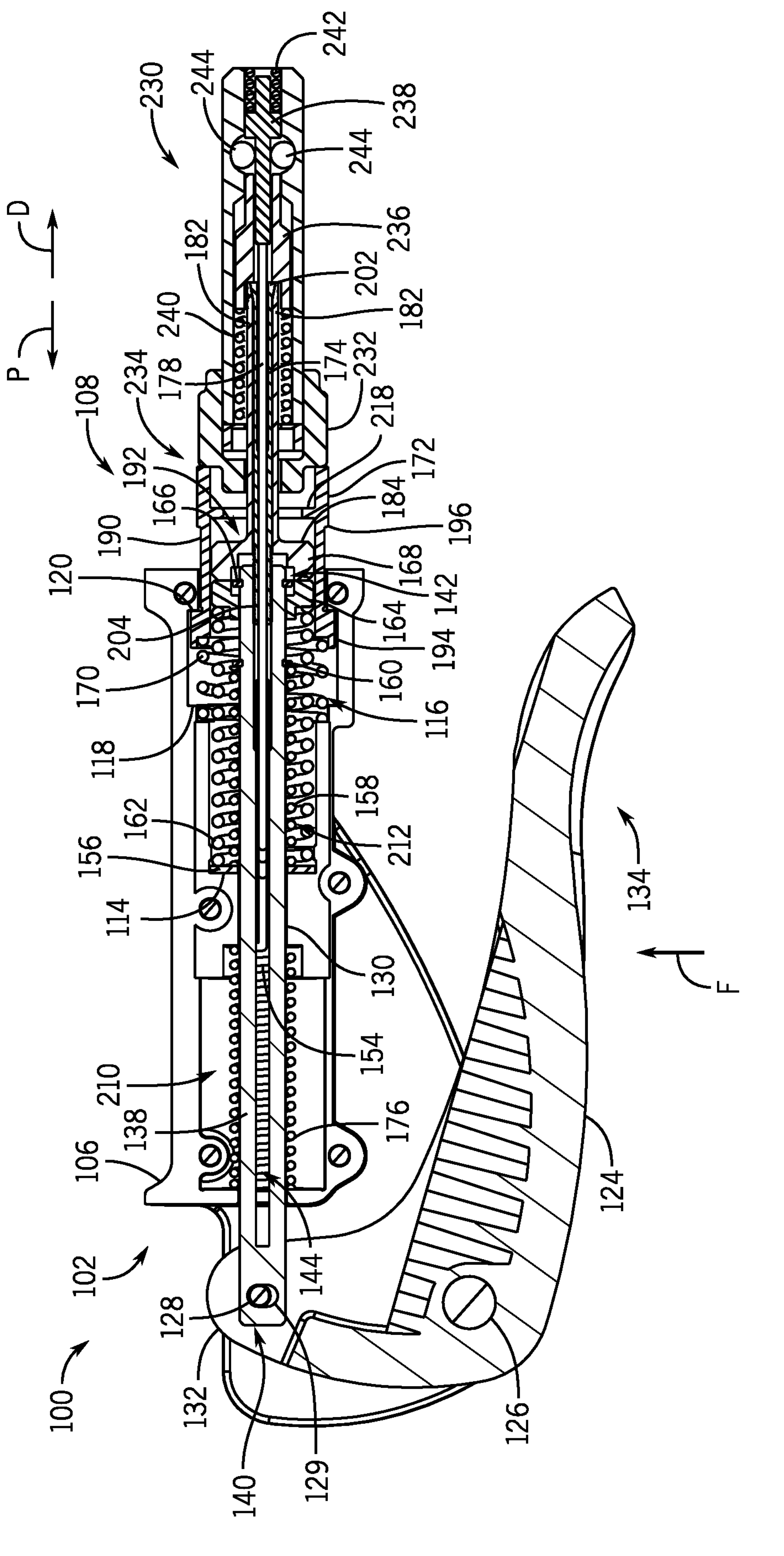
FIG. 6 is a cross-sectional side view of the barrel lock key of FIG. 1 with an external force applied to a lever of the barrel lock to unlock the barrel lock.

FIG. 6 illustrates the barrel lock key 100 in an intermediate position where a force F is applied to the lever 124 in the general direction indicated and the barrel lock 230 is in an unlocked orientation. In general, when a force is applied to the lever 124, a distal end of the lever 124 is rotated about the body pivot pin 126 toward the housing 102 of the barrel lock key 100, and the main rod 130 that is linked to the clevis portion 132 via the rod pin 128 is moved in the proximal direction P relative to the housing 102. When the main rod 130 is moved in the proximal direction P, the inner spring 158 is compressed between the first snap ring 160 and the washer 156. Additionally, when the main rod 130 is moved in the proximal direction P relative to the housing 102, the plunger 174 is also moved in the proximal direction P.

Further illustrated in FIG. 6, the conical end 202 of the plunger 174 is moved a maximum distance in the proximal direction P relative to the finger member 168 so that any further movement of the plunger 174 in the proximal direction P causes the finger member 168 to also move in the proximal direction P relative to the housing 102. When the fingers 182 of the finger member 168 are engaged with a lock plunger of a barrel lock, such as the lock plunger 236 of the barrel lock 230 illustrated in FIG. 6, the fingers 182 operatively couple (e.g., via friction) the lock plunger 236 to the finger member 168. For example, as shown in FIG. 6, the movement of the finger member 168 in the proximal direction P moves the lock plunger 236 of the barrel lock 230 in the proximal direction P. When the lock plunger 236 of the barrel lock 230 is moved in the proximal direction P, the lock spring 240 is compressed. Additionally, when the finger member 168 is moved in the proximal direction P, the main spring 162 is compressed between the collar 164 and the washer 156. In one example embodiment, to establish the unlocked state or condition illustrated in FIG. 4, the force F is generally balanced by the various interacting spring forces of the lock spring 240, the inner spring 158, and the main spring 162. And, in the example embodiment, the nose spring 170 is configured to have sufficient stiffness to counteract and maintain the nose 172 in the distal orientation shown in FIG. 6.

In general, the collar 164 and the finger member 168 are free to move independently within the bore 192 of the nose 172. As described above, the base 184 of the finger member 168 abuts the collar 164 so that the finger member 168 can move or urge the collar 164 in the proximal direction P when the finger member 168 is urged in the proximal direction P (e.g., during an unlocking action). Likewise, the collar 164 can move the finger member 168 in the distal direction D when the collar 164 is urged in the distal direction D (e.g., when the barrel lock key 100 is in an at-rest, neutral state). As shown in FIG. 6, when the main rod 130 pulls the finger member 168 in the proximal direction P via the plunger 174, the finger member 168 urges the collar 164 in the proximal direction P so that both the finger member 168 and the collar 164 move in the proximal direction P within the bore 192 of the nose 172 to compress the main spring 162.

As discussed above, FIG. 6 illustrates the barrel lock 230 in the unlocked orientation such that the lock plunger 236 is moved in the proximal direction P relative to the housing 232, the lock spring 240 is actively compressed, and the detent balls 244 are allowed to move radially inward toward the secondary plunger 238 to unlock the barrel lock 230. While the barrel lock 230 illustrated in FIG. 6 is in the unlocked orientation, the lever 124 (and hence the main rod 130) is in an intermediate stroke position relative to the housing 102. As described above, different barrel locks can require different stroke lengths to operatively unlock the barrel lock. As a result, the stroke length of the barrel lock key that unlocks one barrel lock may be different than the stroke length required to unlock another barrel lock. Attempts to use the incorrect barrel lock key can result in the difficulties described above (e.g., the barrel lock key being disengaged with the barrel lock due to excessive barrel lock key stroke).

Therefore, it can generally be useful to provide an overthrow feature of a barrel lock key so that regardless of a stroke length required by a barrel lock, the barrel lock key can be actuated to a common and repeatable overthrow position/condition while operatively engaging the barrel lock. That is, a barrel lock dependent (i.e., variable) intermediate stroke position required to unlock the barrel lock is achieved and automatically maintained by the barrel lock key, even as the barrel lock key is further actuated beyond the unlock position and into the overthrow condition or position.

Figure 7:
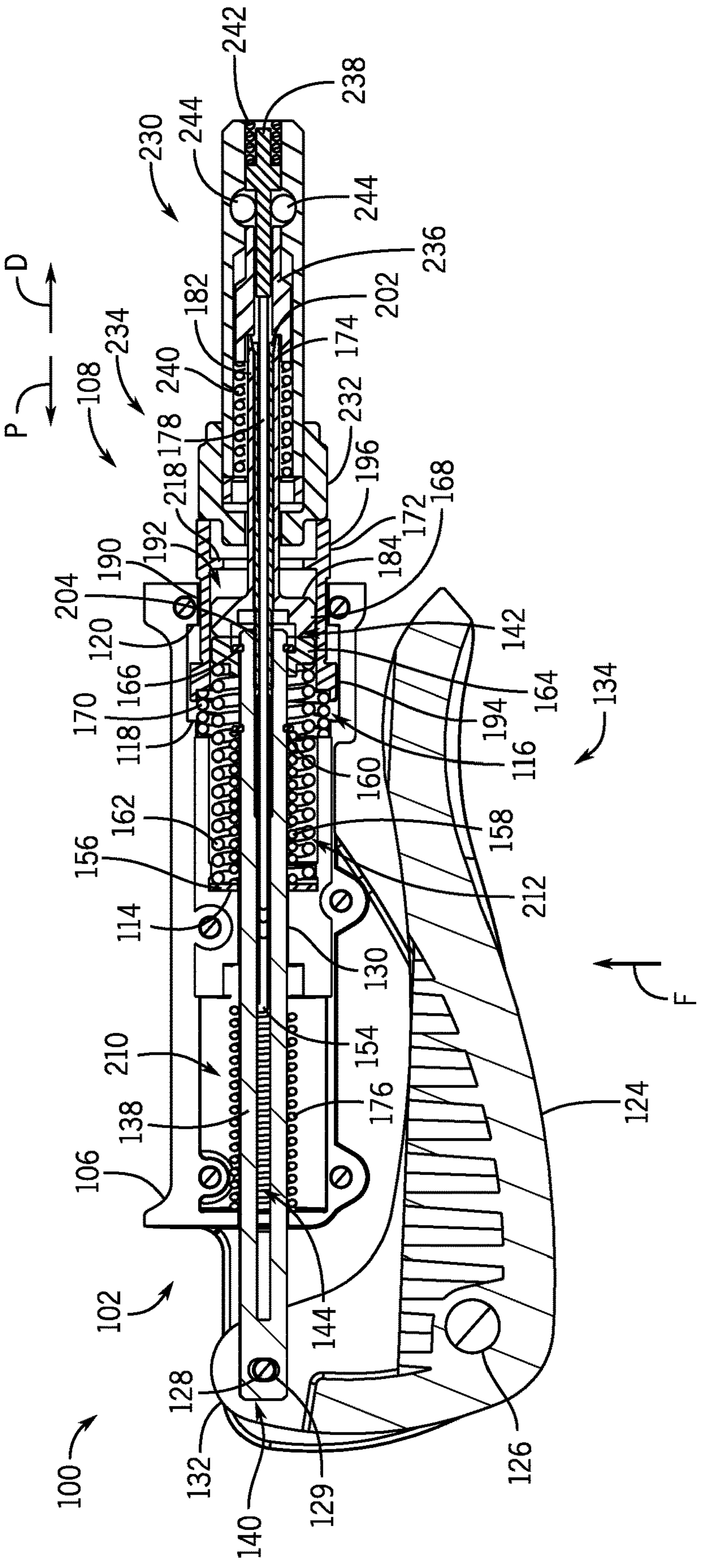
FIG. 7 is a cross-sectional side view of the barrel lock key of FIG. 1 with the lever in an overthrow position and the barrel lock in an unlocked orientation.

FIG. 7 illustrates the barrel lock key 100 in the full overthrow position and the barrel lock 230 in the unlocked orientation. When the lever 124 of the barrel lock key 100 is moved from an intermediate position (e.g., the position illustrated in FIG. 6) to the overthrow position, the main rod 130 is moved again in the proximal direction P relative to the housing 102 and the inner spring 158 is further compressed. As the main rod 130 is moved in the proximal direction P, the fingers 182 pull the barrel lock 230 in the proximal direction P relative to the housing 102 of the barrel lock key 100. When the barrel lock 230 is moved in the proximal direction P, the nose spring 170 is compressed and the nose 172 moves proximally within the housing 102. In general, the nose spring 170 allows the barrel lock 230 to move relative to the housing 102 with the nose 172 while the lock plunger 236 and the lock spring 240 remain static within the barrel lock 230, thus inhibiting excessive forces during an overthrow condition that would otherwise act to overcome the frictional forces coupling the fingers 182 and the lock plunger 236. In one form, the nose spring 170 is configured to only compress when a force associated with operating/pulling back the barrel lock 230 overcomes a preload of the nose spring 170.

Further, when the barrel lock 230 is moved in the proximal direction P and the nose 172 moves proximally within the housing 102, the collar 164 and the finger member 168 remain in a static position relative to the nose 172 within the bore 192 of the nose body 190. As shown in FIG. 7, in the overthrow position, the lever 124 is fully actuated and maximally rotated via the body pivot pin 126 so that the lever 124 extends generally parallel to the housing 102. Correspondingly, the main rod 130 is in a maximum proximal position (e.g., moved fully in the proximal direction P) relative to the housing 102 of the barrel lock key 100.

In general, the force balance established by the system and configuration of the biasing elements (e.g., springs) allows various components of the barrel lock key 100 and the barrel lock 230 to move (or not) at different times during an unlocking action when the barrel lock key 100 is actuated from a neutral position to an intermediate position to an overthrow position. In particular, as described above with reference to FIGS. 4-7, the inner spring 158 can first compress as the main rod 130 moves proximally. The main spring 162 and the lock spring 240 of the barrel lock 230 can compress simultaneously with the inner spring 158 as the main rod 130 continues to move proximally relative to the housing 102 and the lock plunger 236 moves proximally relative to the secondary plunger 238. Finally, the nose spring 170 can compress simultaneously with the inner spring 158 and the main spring 162 to move the nose 172 proximally relative to the housing 102.

In the illustrated embodiment, each of the springs described herein can have various spring characteristics, including spring dimensions (e.g., length and diameter) and stiffness (e.g., spring constant), relative to one another. For example, the inner spring 158 can have a spring constant that is less than the main spring 162 and the main spring 162 can have a spring constant that is less than the nose spring 170. In one form, the preload of the example nose spring 170 is configured to be greater than a solid-state spring force of the lock spring 240 of the barrel lock 230, thereby to inhibit the nose spring 170 from compressing before the barrel lock 230 is functionally/fully unlocked.

It should be understood that throughout the above description, when a spring, such as the rodded spring 154, the inner spring 158, the main spring 162, the nose spring 170, the lock spring 240, and the secondary spring 242, is described as compressed, it may be in the context of compressed beyond the static compression of the spring when the barrel lock key 100 or the barrel lock 230 is in a neutral, at-rest position. For example, any of said springs may be under a static compression when the barrel lock key 100 or the barrel lock 230 is in the neutral position to bias internal components therein. However, when describing any relative movement of said components, the associated spring compression (s) may be in regard to a supplemental compression of the associated spring(s).

With the benefit of this disclosure, it will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, orientation, shape, and other features may vary based on application-specific requirements (e.g., barrel lock to be unlocked).

Various features and advantages of the invention are set forth in the following claims.

We claim:

1. A barrel lock key configured to operatively engage multiple barrel locks having discrete stroke lengths required to unlock a particular barrel lock, the key comprising:
- a body;
- a nose supported by the body and configured to translate relative to the body;
- a nose biasing member configured to urge the nose in a first direction away from the body;
- a main rod supported by the body and configured to translate relative to the body;
- an inner biasing member configured to urge the main rod in the first direction;
- an actuator operatively coupled to the main rod;
- a plunger extending from the main rod and configured to translate with the main rod;
- a finger member supported by the plunger and configured to translate relative to the plunger; and
- a main biasing member configured to urge the finger member in the first direction;
- wherein the plunger is configured to operatively translate relative to the finger member to selectively urge a finger of the finger member away from the plunger.

2. The barrel lock key of claim 1, wherein the nose biasing member is configured to urge the nose in the first direction into engagement with a nose stop defined by the body.

3. The barrel lock key of claim 2, wherein the nose biasing member is a nose spring.

4. The barrel lock key of claim 1, wherein the inner biasing member is configured to urge the main rod in the first direction into engagement with a base defined by the finger member.

5. The barrel lock key of claim 4, wherein the inner biasing member is an inner spring.

6. The barrel lock key of claim 1, wherein the main biasing member is configured to urge a collar supported by the main rod in the first direction into engagement with the finger member.

7. The barrel lock key of claim 6, wherein the main biasing member is a main spring.

8. The barrel lock key of claim 1, wherein the actuator comprises a lever operatively coupled to the body and the main rod such that actuating the lever translates the main rod relative to the body in a second direction opposite to the first direction.

9. The barrel lock key of claim 1, wherein the plunger is threadably coupled to the main rod.

10. The barrel lock key of claim 1, further comprising a rodded spring comprising a coiled section positioned about the main rod and a rod section configured to extend along and through a channel formed in the main rod.

11. The barrel lock key of claim 1, wherein the nose extends beyond the body.

12. The barrel lock key of claim 1, further comprising a collar configured to engage with the finger member and the main biasing member.

13. The barrel lock key of claim 1, wherein the main biasing member is configured to surround the main rod.

14. A barrel lock and key assembly, comprising:
- multiple barrel locks, each of the multiple barrel locks comprising:
  - a lock body;
  - a lock plunger configured to be moveable a stroke length within the lock body between a locked position and an unlocked position; and
  - a lock spring configured to urge the lock plunger in a first direction toward the locked position;
- wherein the stroke length of each of the multiple barrel locks defines a distinct stroke length that is different from the other barrel locks of the multiple barrel locks;
- a barrel lock key configured to operatively engage any of the multiple barrel locks to operatively move the lock plunger of each of the multiple barrel locks the distinct stroke length required to move the lock plunger from the locked position to the unlocked position, the key comprising:
  - a body;
  - a nose supported by the body and configured to translate relative to the body;
  - a nose biasing member configured to urge the nose in the first direction away from the body;
  - a main rod supported by the body and configured to translate relative to the body;
  - an inner biasing member configured to urge the main rod in the first direction;
  - an actuator operatively coupled to the main rod;
  - a plunger extending from the main rod and configured to translate with the main rod;
  - a finger member supported by the plunger and configured to translate relative to the plunger; and
  - a main biasing member configured to urge the finger member in the first direction;
  - wherein the nose extends beyond the body and is configured to engage with the multiple barrel locks;
- wherein, when the barrel lock key is engaged with any of the multiple barrel locks, the barrel lock key is actuatable from a neutral position to an intermediate position and from the intermediate position to an overthrow position;
- wherein, when the barrel lock key is actuated from the neutral position to the intermediate position, the plunger moves relative to the finger member to establish frictional coupling between the finger member and the lock plunger, the main rod is moved in a second direction opposite to the first direction against the urging of the main biasing member, the finger member is moved in the second direction against the urging of the main biasing member, and the lock plunger is moved in the second direction against the urging of the lock spring to move the barrel lock from the locked position into the unlocked position; and
- wherein, when the barrel lock key is actuated from the intermediate position to the overthrow position, the main rod is moved further in the second direction against the urging of the main biasing member, the finger member is moved further in the second direction against the urging of the main biasing member, and the nose is moved in the second direction against the urging of the nose biasing member.

15. The barrel lock and key assembly of claim 14, wherein:
- the nose biasing member comprises a noise spring;
- the inner biasing member comprises an inner spring; and
- the main biasing member comprises a main spring.

16. The barrel lock key and key assembly of claim 14, wherein the actuator comprises a lever operatively coupled to the body and the main rod such that actuating the lever translates the main rod relative to the body in a second direction opposite to the first direction.

17. The barrel lock and key assembly of claim 14, wherein, when the barrel lock key is actuated from the neutral position to the intermediate position, the main rod is moved in the second direction opposite to the first direction against the urging of the inner biasing member.

18. The barrel lock and key assembly of claim 14, wherein, when the barrel lock key is actuated from the neutral position to the intermediate position, the main biasing member and the inner biasing member compress simultaneously.

19. The barrel lock and key assembly of claim 14, wherein, when the barrel lock key is actuated from the intermediate position to the overthrow position, the nose biasing member, the inner biasing member, and the main biasing member compress simultaneously.

20. A barrel lock key configured to operatively engage multiple barrel locks having discrete stroke lengths required to unlock a particular barrel lock, the key comprising:

a body;

a nose supported by the body and configured to translate relative to the body;

a nose biasing member configured to urge the nose in a first direction away from the body;

a main rod supported by the body and configured to translate relative to the body;

an inner biasing member configured to urge the main rod in the first direction;

an actuator operatively coupled to the main rod;

a plunger extending from the main rod and configured to translate with the main rod;

a finger member supported by the plunger and configured to translate relative to the plunger; and a main biasing member configured to urge the finger member in the first direction;

wherein the inner biasing member is configured to urge the main rod in the first direction into engagement with a base defined by the finger member.

21. A barrel lock key configured to operatively engage multiple barrel locks having discrete stroke lengths required to unlock a particular barrel lock, the key comprising:

a body;

a nose supported by the body and configured to translate relative to the body;

a nose biasing member configured to urge the nose in a first direction away from the body;

a main rod supported by the body and configured to translate relative to the body;

an inner biasing member configured to urge the main rod in the first direction;

an actuator operatively coupled to the main rod;

a plunger extending from the main rod and configured to translate with the main rod;

a finger member supported by the plunger and configured to translate relative to the plunger; and a main biasing member configured to urge the finger member in the first direction;

wherein the main biasing member is configured to urge a collar supported by the main rod in the first direction into engagement with the finger member.

22. A barrel lock key configured to operatively engage multiple barrel locks having discrete stroke lengths required to unlock a particular barrel lock, the key comprising:

a body;

a nose supported by the body and configured to translate relative to the body;

a nose biasing member configured to urge the nose in a first direction away from the body;

a main rod supported by the body and configured to translate relative to the body;

an inner biasing member configured to urge the main rod in the first direction;

an actuator operatively coupled to the main rod;

a plunger extending from the main rod and configured to translate with the main rod, wherein the plunger is threadably coupled to the main rod;

a finger member supported by the plunger and configured to translate relative to the plunger; and a main biasing member configured to urge the finger member in the first direction.

23. A barrel lock key configured to operatively engage multiple barrel locks having discrete stroke lengths required to unlock a particular barrel lock, the key comprising:

a body;

a nose supported by the body and configured to translate relative to the body;

a nose biasing member configured to urge the nose in a first direction away from the body;

a main rod supported by the body and configured to translate relative to the body;

an inner biasing member configured to urge the main rod in the first direction;

an actuator operatively coupled to the main rod;

a plunger extending from the main rod and configured to translate with the main rod;

a finger member supported by the plunger and configured to translate relative to the plunger;

a main biasing member configured to urge the finger member in the first direction; and a rodded spring comprising a coiled section positioned about the main rod and a rod section configured to extend along and through a channel formed in the main rod.

24. A barrel lock key configured to operatively engage multiple barrel locks having discrete stroke lengths required to unlock a particular barrel lock, the key comprising:

a body;

a nose supported by the body and configured to translate relative to the body, wherein the nose extends beyond the body;

a nose biasing member configured to urge the nose in a first direction away from the body;

a main rod supported by the body and configured to translate relative to the body;

an inner biasing member configured to urge the main rod in the first direction;

an actuator operatively coupled to the main rod;

a plunger extending from the main rod and configured to translate with the main rod;

a finger member supported by the plunger and configured to translate relative to the plunger; and a main biasing member configured to urge the finger member in the first direction.

* * * * *